US009155036B1

(12) United States Patent
Singh et al.

(10) Patent No.: US 9,155,036 B1
(45) Date of Patent: Oct. 6, 2015

(54) CELL SELECTION OFFSET USED TO INDICATE WIRELESS CELL UNSUITABLE FOR COMMUNICATIONS

(71) Applicant: Sprint Communications Company L.P., Overland Park, KS (US)

(72) Inventors: Jasinder Pal Singh, Olathe, KS (US); Maulik K. Shah, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 383 days.

(21) Appl. No.: 13/741,541

(22) Filed: Jan. 15, 2013

(51) Int. Cl.
*H04W 4/00* (2009.01)
*H04W 48/20* (2009.01)

(52) U.S. Cl.
CPC .................................... *H04W 48/20* (2013.01)

(58) Field of Classification Search
USPC .................... 455/435.1–435.3, 436–444, 434
See application file for complete search history.

(56) References Cited

U.S. PATENT DOCUMENTS 6,978,142 B2 * 12/2005 Jokimies ....................... 455/449
2011/0263252 A1 * 10/2011 Saini et al. .................... 455/434

* cited by examiner

*Primary Examiner* — Brandon Miller (57) ABSTRACT

Embodiments disclosed herein provide systems and methods for compelling a cell selection metric to indicate that a wireless cell is not suitable for communications. In a particular embodiment, a method provides receiving system information from a base station of a visited wireless communication network. The method further provides calculating a cell selection metric from cell selection parameters within the system information and a cell selection offset stored in the wireless communication device, wherein the cell selection offset causes the cell selection metric to indicate an unsuitable wireless cell. The method further provides receiving a request for a data connection from an application executing on the wireless communication device and, in response to the request, recalculating the cell selection metric from the cell selection parameters without the cell selection offset. The method further provides determining whether the wireless cell is suitable for communications based on the cell selection metric.

20 Claims, 6 Drawing Sheets

$Srxlev = Q_{rxlevmeas} - Q_{rxlevmin} - P_{compensation}$ $Srxlev = Q_{rxlevmeas} - (Q_{rxlevmin} + Q_{offset}) - P_{compensation}$

CELL SELECTION OFFSET USED TO INDICATE WIRELESS CELL UNSUITABLE FOR COMMUNICATIONS

TECHNICAL BACKGROUND

Many wireless network operators enter into roaming agreements with one or more other wireless network operators. The roaming agreements allow wireless devices to exchange wireless communications with visited wireless networks when a home wireless network, to which the wireless devices are subscribed, is not available. Moreover, a roaming agreement may allow a visited wireless network to provide wireless connectivity over a protocol that is not available on a home wireless network in the same area despite the home wireless network offering connectivity in the area over other protocols. For example, the visited wireless network may provide service in the area using both 3G and 4G wireless protocols while the home wireless network only provides service using the 3G protocol. Thus, even though the home wireless network is available in the area, a wireless device may be able to roam on the visited wireless network using the 4G protocol.

The roaming agreements discussed above typically require a fee be paid the home wireless network operator to the visited wireless network operator for the use of the visited wireless network. Moreover, these fees may vary depending on the protocol used by a wireless device when roaming. Accordingly, limiting when a wireless device roams and what protocol the wireless device uses when roaming may help minimize roaming fees paid by the home wireless network operator.

Overview

Embodiments disclosed herein provide systems and methods for compelling a cell selection metric to indicate that a wireless cell is not suitable for communications. In a particular embodiment, a method provides receiving system information from a base station of a visited wireless communication network, wherein the system information includes at least a portion of cell selection parameters for a wireless cell of the base station. The method further provides calculating a cell selection metric from the cell selection parameters and a cell selection offset stored in the wireless communication device, wherein the cell selection offset causes the cell selection metric to indicate that the wireless cell is not suitable for communications. The method further provides receiving a request for a data connection from an application executing on the wireless communication device and, in response to the request, recalculating the cell selection metric from the cell selection parameters without the cell selection offset. The method further provides determining whether the wireless cell is suitable for communications based on the cell selection metric.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
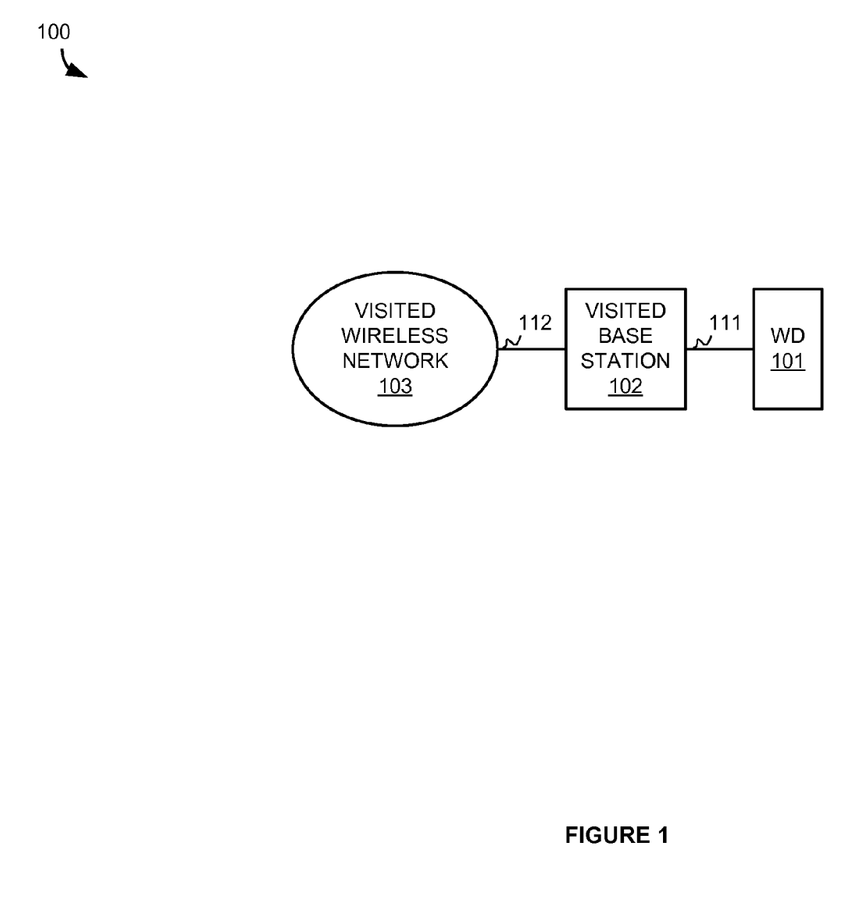
FIG. 1 illustrates a wireless communication system for compelling a cell selection metric to indicate that a cell is not suitable for communications.

FIG. 1 illustrates wireless communication system 100. Wireless communication system 100 includes wireless communication device 101, visited wireless base station 102, and visited wireless communication network 103. Wireless communication device 101 and visited wireless base station 102 communicate over wireless link 111. Visited wireless base station 102 and visited wireless communication network 103 communicate over communication link 112.

In operation, wireless device 101 determines whether to exchange communications with a wireless cell of a wireless base station based on a cell selection metric. Thus, when wireless device 101 is determining whether to exchange communications with a cell of visited base station 102, wireless device 101 calculates the cell selection metric for that cell. Wireless device 101 may calculate a cell selection metric for more than one cell of visited base station 102 and/or for cells of other base stations as well. Wireless device 101 may then select a cell based on the calculated cell selection metrics that indicate that the cell is suitable for communications. For example, the cell selection metric for a cell may need to be above a certain value for the cell to be suitable for communications and wireless device 101 will only select a cell from those suitable cells.

The information used by wireless device 101 for calculating a cell selection metric may be received from a base station serving that cell, measured by wireless device 101 itself, stored on wireless device 101, or otherwise received by wireless device 101—including combinations thereof. After calculating cell selection metrics and determining which of the cell selection metrics fail to satisfy the criteria indicating that the corresponding cell is suitable for communications, wireless device 101 selects from the satisfactory cell selection metrics based on criteria, such as cells having higher cell selection metric values, cells using wireless protocols having higher data speed or throughput, or any other criteria that would indicate the selection of one cell over another—including combinations thereof.

Figure 2:
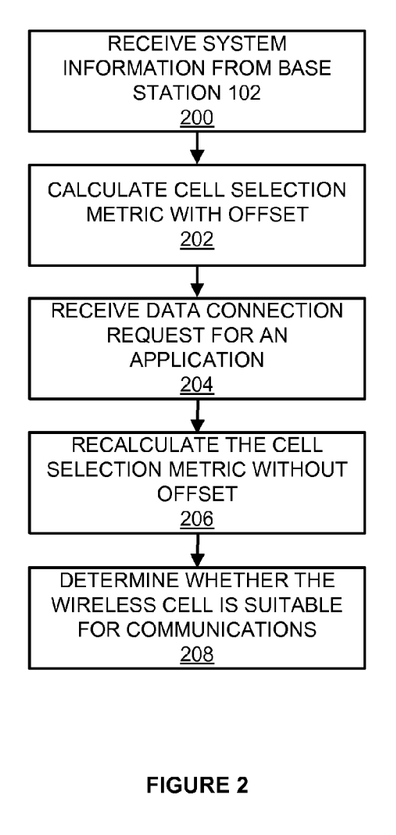
FIG. 2 illustrates an operation of the wireless communication system for compelling a cell selection metric to indicate that a cell is not suitable for communications.

FIG. 2 illustrates the operation of wireless communication system 100 for compelling a cell selection metric to indicate that a cell is not suitable for communications. Wireless device 101 receives system information from visited base station 102, which is a base station of visited wireless communication network 103 (step 200). The system information includes at least a portion of cell selection parameters for a wireless cell of visited base station 102. The portion of the cell selection parameters in the system information may include values that are specific to the cell and/or values that are measured by visited base station 102 itself, such as a minimum required received power level for the cell, a maximum power level that wireless device 101 is allowed to transmit in the cell, a maximum power level that wireless device 101 is allowed to transmit according to a power class of wireless device 101, or any other type of parameter that may be useful when calculating a cell selection metric. Other portions of the cell selection parameters may be stored on wireless device 101, measured by wireless device 101, or otherwise received by wireless device 101.

Wireless device 101 calculates a cell selection metric from the cell selection parameters and a cell selection offset stored in the wireless communication device (step 202). The cell selection offset causes the cell selection metric to indicate that the wireless cell is not suitable for communications. For example, the cell selection offset may be a value that causes the calculated cell selection metric, regardless of the cell selection parameters' values, to not satisfy a threshold value necessary for the metric to indicate that the wireless cell is suitable for communications. The cell selection offset may be stored on wireless device 101 after being received from a home wireless communication network associated with wireless device 101. The cell selection offset may be received via a base station of the home wireless network, visited base station 102, another base station of visited wireless network 103, a base station of another visited wireless network, a wireless fidelity (WIFI) connection, or any other means by which a wireless device can receive information. Along with the offset or at some other time, wireless device may further receive instructions indicating circumstances the cell selection offset should be used. For example, the instructions may indicate particular protocols for which the offset should be used, whether the offset should be used on a home or visited wireless network, times when the offset should be used, or any other possible circumstance under which a wireless device may be used—including combinations thereof.

Wireless device 101 receives a request for a data connection from an application executing on wireless device 101 (step 204). The application may be a web browser, game, email application, messaging application, video player, social networking application, calendar, the operating system of wireless device 101, or any other type of application that can execute on a wireless device and request a wireless data connection. In response to the request, wireless device 101 recalculates the cell selection metric from the cell selection parameters without the cell selection offset (step 206). Without the cell selection offset, the cell selection metric is able to indicate that the cell is suitable for communications without the artificial offset forcing the metric to indicate that the wireless cell is not suitable for communications.

In some embodiments, the application is an application actively in use by a user of wireless device 101 and not simply an application executing in the background on wireless device 101. Thus, wireless device 101 will calculate the cell selection metric without the offset only if the user of wireless device 101 is actively using the application. For example, if the application is an email application, then the user would have to actively be interacting with the email application in order for a data connection request from the email application to cause the recalculation of the cell selection metric without the offset. If the email application is merely executing in the background, such as periodically checking for new email, then the data connection request from the email application will not cause the recalculation of the cell selection metric without the offset.

Wireless device 101 determines whether the wireless cell is suitable for communications based on the cell selection metric (step 208). The cell selection metric may indicate that the wireless cell is suitable for communications if the cell selection metric is calculated to satisfy a threshold value. For example, the cell selection metric may need to be above a threshold value in order to consider the wireless cell associated with the cell selection metric suitable for communications. Wireless device 101 will determine that the wireless cell is suitable for communications if the cell selection metric is above the threshold value. Thus, if the cell selection metric is calculated with the offset, then the cell selection metric will be below the threshold value and wireless device 101 will determine that the wireless cell is not suitable for communications. On the other hand, if the cell selection metric is calculated without the offset, then the cell selection metric may be above or below the threshold depending on the value of the cell selection metric and wireless device 101 will determine the communication suitability of the wireless cell accordingly.

If wireless device 101 determines that the cell selection metric indicates that the wireless cell is suitable for communications, then wireless device 101 will consider the wireless cell when selecting a wireless cell for exchanging communications. For example, wireless device 101 may have determined that other wireless cells are also suitable for communications based on cell selection metrics for those individual cells. Wireless device 101 may then use other criteria for selecting a wireless cell for communications from the suitable wireless cells. Wireless device 101 may select the wireless cell based on the values of the cell selection metrics between the suitable wireless cells, based on communication loading among the suitable wireless cells, based on data speed or throughput among the suitable wireless cells, based on wireless protocols used by the suitable wireless cells, based on whether a suitable wireless cell is associated with a home or a visited wireless communication network, or any other criteria that a wireless device may use when selecting a wireless cell for exchanging communications—including combinations thereof.

Advantageously, the above method uses the cell selection offset to force wireless device 101 to not select certain wireless cells unless an application is requesting the data connection. This may allow a home wireless network operator to limit the wireless cells of visited base stations to which wireless device 101 can select when wireless device 101 is not actively being used by a user.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Visited base station 102 comprises RF communication circuitry and an antenna. The RF communication circuitry typically includes an amplifier, filter, RF modulator, and signal processing circuitry. Visited base station 102 may also comprise a router, server, memory device, software, processing circuitry, cabling, power supply, network communication interface, structural support, or some other communication apparatus.

Visited wireless communication network 103 comprises network elements that provide communications services to wireless device 101 through visited base station 102. Visited wireless communication network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
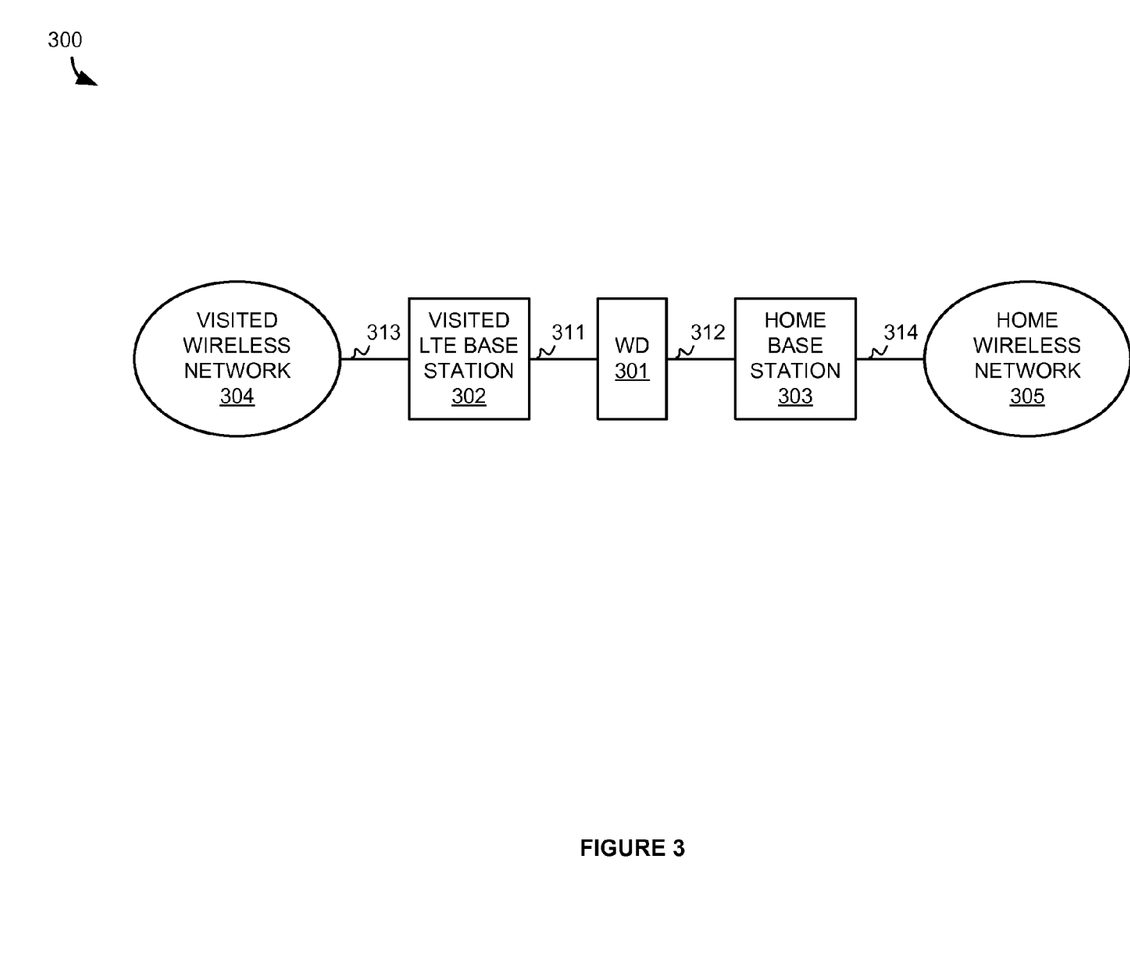
FIG. 3 illustrates a wireless communication system for compelling a cell selection metric to indicate that a cell is not suitable for communications.

FIG. 3 illustrates wireless communication system 300. Wireless communication system 300 includes wireless communication device 301, visited LTE base station 302, home base station 303, visited wireless communication network 304, and home wireless communication network 305. Wireless communication device 301 and visited LTE base station 302 communicate over wireless link 311. Wireless communication device 301 and home base station 303 communicate over wireless link 312. Visited LTE base station 302 and visited wireless communication network 304 communicate over communication link 313. Home base station 302 and home wireless communication network 305 communicate over communication link 314.

Figure 4:
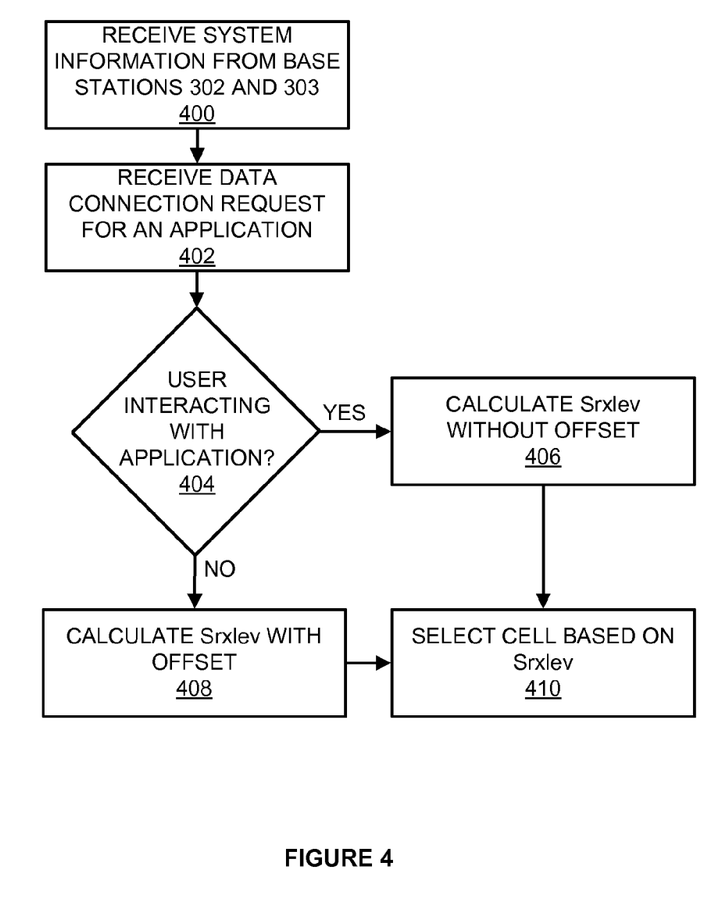
FIG. 4 illustrates an operation of the wireless communication system for compelling a cell selection metric to indicate that a cell is not suitable for communications.

FIG. 4 illustrates the operation of wireless communication system 300 for compelling a cell selection metric to indicate that a cell is not suitable for communications. In operation, wireless device 301 is associated with home wireless network 305 by an owner of wireless device 301 subscribing to the services of home wireless network 305 or by some other means of association. When wireless device 301 is not communicating with base stations of home wireless network 305, wireless device 301 may communicate with base stations of visited wireless network 304 on a roaming basis.

In this embodiment, a roaming agreement between the operator of home wireless network 305 and visited wireless network 304 allows wireless device 301 to exchange LTE communications with LTE base stations of visited wireless network 304. However, when wireless device 301 uses base stations of visited wireless network 304 to exchange communications, the operator of home wireless network 305 typically must pay the operator of visited wireless network 304 for that use. Therefore, even if home wireless network 305 does not have LTE coverage within the LTE coverage area of visited wireless network 304, the operator of home wireless network 305 may desire that wireless device 301 not communicate with LTE base stations of visited wireless network 304.

In order to prevent wireless device 301 from exchanging communications with visited LTE base stations, wireless device 301 uses a cell selection offset to indicate that visited LTE cells are not suitable for communications. As will be further explained below, the offset will force wireless device 301 to communicate with a cell of a non-LTE base station 303 of home wireless network 305. In alternative embodiments, a base station of home wireless network 305 may not be available and the offset will force wireless device 301 to communicate with a cell of a non-LTE base station of visited wireless network 304, which would be desirable if a roaming fee for the use of LTE is more expensive than a roaming fee for one or more other protocols. Based on the above considerations, home wireless network 305 may instruct wireless device 301 to use an offset in certain instances when calculating a cell selection metric for visited LTE wireless cells to help the operator of home wireless network 305 minimize roaming fees.

As described in FIG. 4, wireless device 301 receives system information from visited LTE base station 302 and home base station 303 (step 400). This system information may be included in one or more control channels for each base station. The system information includes a portion of the cell parameters used by wireless device 301 when determining whether to a particular wireless cell is suitable for exchanging communications. Separate system information may be received for each wireless cell from which wireless device 301 receives a control signal or individual cell information may be included in a single system information transmission.

For simplicity, in this embodiment, wireless device 301 only receives system information for a single cell from each of base stations 302 and 303. Included in the system information from each of base stations 302 and 303 is a minimum required received power level value ($Q_{rxlevmin}$) and a compensation power level ($P_{compensation}$) for each respective cell. $P_{compensation}$ is computed by subtracting a maximum power that compensation wireless device 301 is allowed to transmit according to a power class of wireless device 301 ($P_{UMAX}$) from a maximum power that wireless device 301 is allowed to transmit in the respective wireless cell ($P_{EMAX}$). $P_{compensation}$ may be received as an already calculated value or may be received as a $P_{UMAX}$ and a $P_{EMAX}$ from which wireless device 301 itself calculates $P_{compensation}$.

Wireless device 301 further receives a data connection request from an application executing on wireless device 301 (step 402). The application may be a web browser, email client, messaging client, video viewing application, social networking application, an element of the operating system of wireless device 301, or any other type of application capable of executing on wireless device 301. The data connection may be requested by the application to transfer or receive data from a system that can be accessed using visited wireless network 304 or home wireless network 305, such as an application server on the Internet.

To fulfill the data connect request, wireless device 301 determines whether a user of wireless device 301 is currently interacting with the application (step 404). The user may be currently interacting with the application if the user is interacting with a user interface of wireless device 301 to provide input for the application, such as using a touch screen, using a keyboard, pushing a button, speaking audible commands, or otherwise. The user may also be considered as currently interacting with the application if the application is executing in the foreground on wireless device 301 rather than simply performing background tasks, such may be the case when a user is watching a video but is not providing input to the application. Wireless device 301 may use other methods of determining whether a user is currently interacting with an application in addition to the two described above and including combinations thereof.

Figure 5:
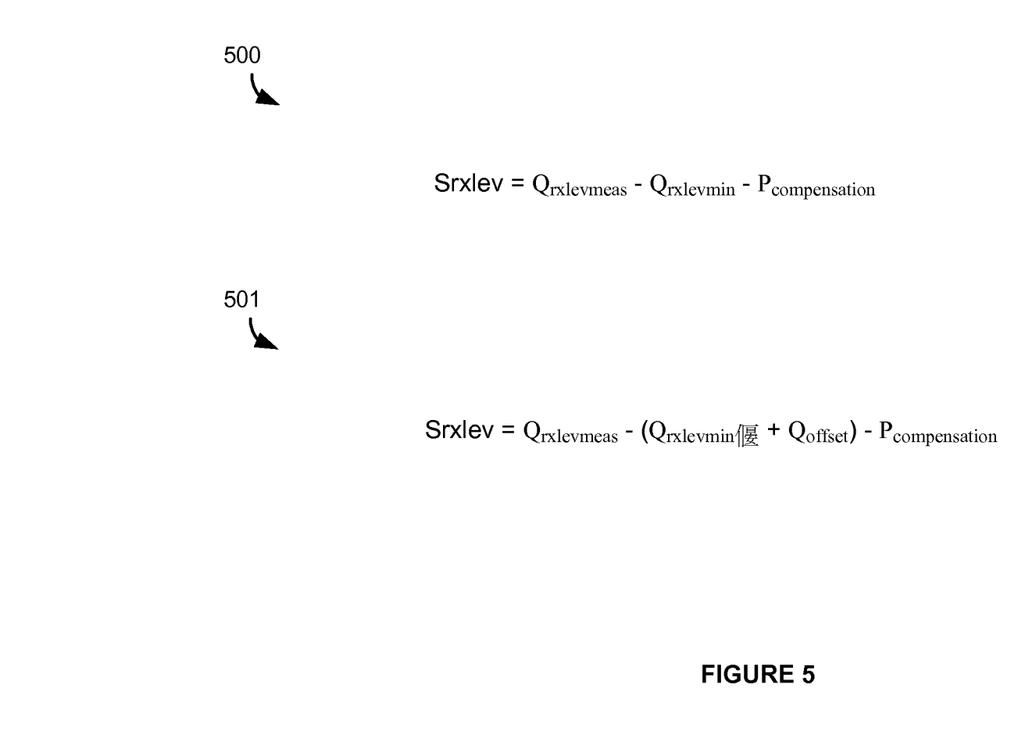
FIG. 5 illustrates equations for calculating a cell selection metric.

If wireless device 301 determines that the user is currently interacting with the application, then wireless device 301 calculates a cell selection metric for each wireless cell without a cell selection offset (step 406). A commonly used equation for calculating a cell selection metric (Srxlev) is equation 500 shown in FIG. 5. The equation uses $Q_{rxlevmin}$ and $P_{compensation}$ received in the system information from base stations 302 and 303. The equation further uses a measured received power level value ($Q_{rxlevmeas}$) for each wireless cell as measured by wireless device 301.

After calculating Srxlev for each wireless cell, wireless device 301 selects a cell for communications based on Srxlev (step 410). To select a cell based on Srxlev, wireless device 301 determines whether the Srxlev for each cell is greater than zero. If Srxlev is greater than zero, then the corresponding cell is suitable for exchanging wireless communications. If Srxlev is not greater than zero, then the corresponding cell is not suitable for exchanging communications. If both cells are suitable for communications, the wireless device 301 will select the cell from visited LTE base station 302 over the cell from home base station 303 because the LTE cell may provide faster data communications than the non-LTE cell of home base station 303. In some embodiments, wireless device 301 may calculate Srxlev for the cell of visited LTE base station 303 to determine whether that cell is suitable for communications before calculating the Srxlev for the cell of home base station 302.

Returning to the determination of step 404, if wireless device 301 determines that the user is not currently interacting with the application, then wireless device 301 calculates a cell selection metric for the wireless cell from visited LTE base station with a cell selection offset (step 408). The cell selection offset ($Q_{offset}$) is placed into the Srxlev equation as shown in equation 501 of FIG. 5. $Q_{offset}$ is a value such that the calculated Srxlev will not be greater than zero no matter what the values are of the other parameters in equation 501. Srxlev for home base station 303 is calculated without $Q_{offset}$ using equation 500 in a similar manner as described above in step 406.

After calculating Srxlev for each wireless cell, wireless device 301 selects a cell for communications based on the calculated Srxlev in a similar manner to that described above (step 410). Since $Q_{offset}$ was used when calculating the Srxlev of the wireless cell from visited LTE base station 302, Srxlev for that wireless cell is below zero and indicates that the wireless cell is not suitable for communications. Accordingly, wireless device 301 will not select visited base station 302 for communications and will choose the wireless cell from home base station 303 if the Srxlev for the wireless cell of home base station 303 is greater than zero. In some embodiments, if the Srxlev for the wireless cell of base station 303 also indicates that the wireless cell is not suitable for communications and no other suitable wireless cell is available, then wireless device 301 may recalculate the Srxlev of the wireless cell from visited LTE base station 302 to determine whether that wireless cell is suitable for communications.

If wireless device 301 selects the wireless cell from visited LTE base station 302 to exchange communications in step 410, then once the application is finished exchanging communications over the requested data session wireless device 301 may recalculate the Srxlev of that wireless cell using $Q_{offset}$. Accordingly, wireless device 301 will only use a wireless cell from visited LTE base station 302 when the communications are for an application that is being actively used by a user. This allows a user to experience the data speed potential of an LTE network when actively using applications on wireless device 301 and spares the home wireless network operator from having to pay LTE roaming fees for exchanging background application data that the user would be less likely to notice.

Figure 6:
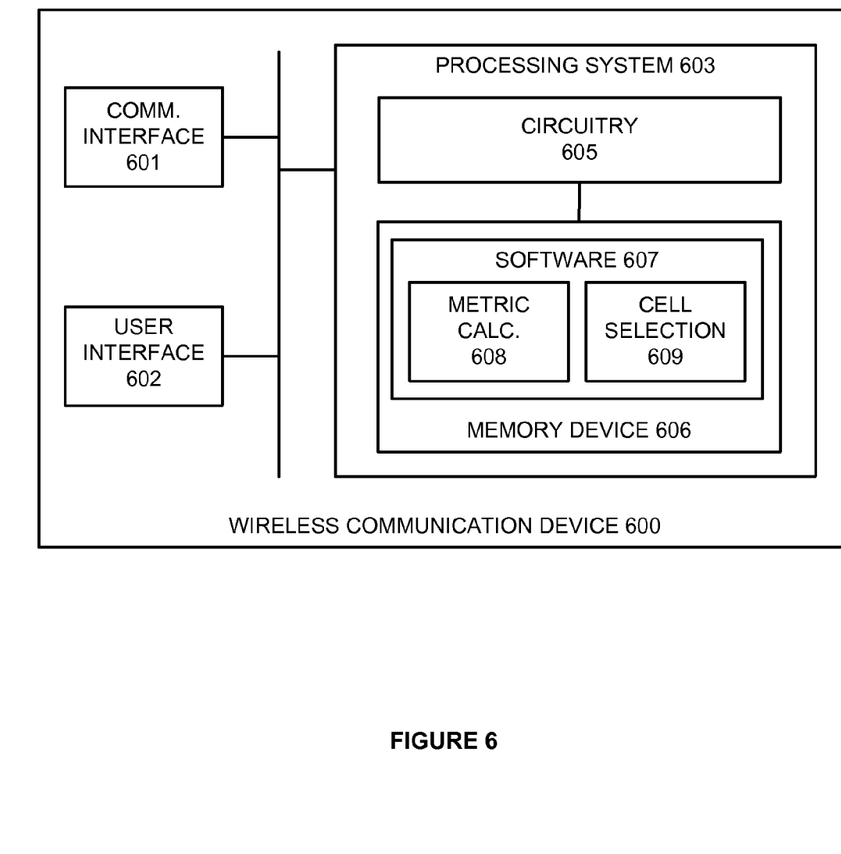
FIG. 6 illustrates a wireless communication device for compelling a cell selection metric to indicate that a cell is not suitable for communications.

FIG. 6 illustrates wireless communication device 600. Wireless communication device 600 is an example of wireless communication device 101, although device 101 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes cell selection metric calculation module 608 and cell selection module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, operating software 607 directs processing system 603 to receive system information via communication interface 601 from a base station of a visited wireless communication network, wherein the system information includes at least a portion of cell selection parameters for a wireless cell of the base station. Cell selection metric calculation module 608 directs processing system 603 to calculate a cell selection metric from the cell selection parameters and a cell selection offset stored in the wireless communication device, wherein the cell selection offset causes the cell selection metric to indicate that the wireless cell is not suitable for communications. Operating software 607 directs processing system 603 to receive a request for a data connection from an application executing on wireless communication device 600. In response to the request, cell selection metric calculation module 608 directs processing system 603 to recalculate the cell selection metric from the cell selection parameters without the cell selection offset. Cell selection module 609 directs processing system 603 to determine whether the wireless cell is suitable for communications based on the cell selection metric The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:
    receiving system information from a base station of a visited wireless communication network, wherein the system information includes at least a portion of cell selection parameters for a wireless cell of the base station;
    calculating a cell selection metric from the cell selection parameters and a cell selection offset stored in the wireless communication device, wherein the cell selection offset causes the cell selection metric to indicate that the wireless cell is not suitable for communications;
    receiving a request for a data channel from an application executing on the wireless communication device;
    in response to the request, recalculating the cell selection metric from the cell selection parameters without the cell selection offset; and
    determining whether the wireless cell is suitable for communications based on the recalculated cell selection metric.

2. The method of claim 1, further comprising:
    if the wireless cell is not suitable for communications based on the cell selection metric, calculating a second cell selection metric from second cell selection parameters for a second wireless cell from a second base station; and
    selecting the second wireless cell if the second cell selection metric indicates that the second wireless cell is suitable for communications.

3. The method of claim 2, wherein a home wireless communication network comprises the second base station.

4. The method of claim 1, wherein the wireless cell uses a Long Term Evolution (LTE) protocol.

5. The method of claim 1, wherein the cell selection parameters comprise:
    a measured received power level value ($Q_{rxlevmeas}$) for the wireless cell as measured by the wireless communication device;
    a minimum required received power level value ($Q_{rxlevmin}$), wherein $Q_{rxlevmin}$ is included in the system information;
    a compensation power level ($P_{compensation}$), wherein the compensation power level equals the maximum of $P_{EMAX}-P_{UMAX}$ or 0, wherein $P_{EMAX}$ is the maximum power the wireless communication device is allowed to transmit in the wireless cell and $P_{UMAX}$ is the maximum power the wireless communication device is allowed to transmit according to a power class of the wireless communication device, and wherein both $P_{EMAX}$ and $P_{UMAX}$ are included in the system information.

6. The method of claim 5, wherein calculating the cell selection metric uses the following equation:

the cell selection metric (Srxlev)=$Q_{rxlevmeas}$−($Q_{rxlevmin}$+the cell selection offset)−$P_{compensation}$.

7. The method of claim 6, wherein determining whether the wireless cell is suitable for communications based on the cell selection metric, comprises:
    determining that the wireless cell is suitable for communications if Srxlev is greater than 0; and
    determining that the wireless cell is not suitable for communications if Srxlev is less than or equal to 0.

8. The method of claim 7, wherein the cell selection offset comprises a value that causes the Srxlev to be less than or equal to 0.

9. The method of claim 1, further comprising:
    after the application is done using the data channel, recalculating the cell selection metric from the cell selection parameters with the cell selection offset.

10. The method of claim 1, wherein a user of the wireless communication device is actively using the application.

11. A wireless communication device, comprising:
    a wireless communication interface configured to receive system information from a base station of a visited wireless communication network, wherein the system information includes at least a portion of cell selection parameters for a wireless cell of the base station;
    a processing system configured to calculate a cell selection metric from the cell selection parameters and a cell selection offset stored in the wireless communication device, wherein the cell selection offset causes the cell selection metric to indicate that the wireless cell is not suitable for communications, receive a request for a data channel from an application executing on the wireless communication device, in response to the request, recalculate the cell selection metric from the cell selection parameters without the cell selection offset, and determine whether the wireless cell is suitable for communications based on the recalculated cell selection metric.

12. The wireless communication device of claim 11, further comprising:
    the processing system further configured to, if the wireless cell is not suitable for communications based on the cell selection metric, calculate a second cell selection metric from second cell selection parameters for a second wireless cell from a second base station and select the second wireless cell if the second cell selection metric indicates that the second wireless cell is suitable for communications.

13. The wireless communication device of claim 12, wherein a home wireless communication network comprises the second base station.

14. The wireless communication device of claim 11, wherein the wireless cell uses a Long Term Evolution (LTE) protocol.

15. The wireless communication device of claim 11, wherein the cell selection parameters comprise:
    a measured received power level value ($Q_{rxlevmeas}$) for the wireless cell as measured by the wireless communication device;
    a minimum required received power level value ($Q_{rxlevmin}$), wherein $Q_{rxlevmin}$ is included in the system information;
    a compensation power level ($P_{compensation}$), wherein the compensation power level equals the maximum of $P_{EMAX}-P_{UMAX}$ or 0, wherein $P_{EMAX}$ is the maximum power the wireless communication device is allowed to transmit in the wireless cell and $P_{UMAX}$ is the maximum power the wireless communication device is allowed to transmit according to a power class of the wireless communication device, and wherein both $P_{EMAX}$ and $P_{UMAX}$ are included in the system information.

16. The wireless communication device of claim 15, wherein the processing system is configured to calculate the cell selection metric uses the following equation:

the cell selection metric(Srxlev)=$Q_{rxlevmeas}$−($Q_{rxlevmin}$+the cell selection offset)−$P_{compensation}$.

17. The wireless communication device of claim 16, wherein the processing system is configured to determine whether the wireless cell is suitable for communications based on the cell selection metric by:
   determining that the wireless cell is suitable for communications if Srxlev is greater than 0; and
   determining that the wireless cell is not suitable for communications if Srxlev is less than or equal to 0.

18. The wireless communication device of claim 17, wherein the cell selection offset comprises a value that causes the Srxlev to be less than or equal to 0.

19. The wireless communication device of claim 11, further comprising:
   the processing system configured to, after the application is done using the data channel, recalculate the cell selection metric from the cell selection parameters with the cell selection offset.

20. The wireless communication device of claim 11, wherein a user of the wireless communication device is actively using the application.

* * * * *